3,741,928
EPOXIDE MOLDING COMPOSITIONS CONTAINING META-TOLYLENE DIAMINE AND A SILICIOUS FILLER
George A. Salensky, Metuchen, N.J., assignor to Union Carbide Corporation, New York, N.Y.
No Drawing. Continuation-in-part of application Ser. No. 698,140, Jan. 16, 1968. This application July 21, 1971, Ser. No. 164,818
Int. Cl. C08g 51/04
U.S. Cl. 260—37 EP          10 Claims

ABSTRACT OF THE DISCLOSURE

The disclosure of this application is directed to epoxide molding compositions, containing m-tolylenediamine and a silicious filler, which have excellent shelf life and can be molded into shaped articles characterized by excellent properties.

---

This application is a continuation-in-part of my co-pending application Ser. No. 698,140, filed Jan. 16, 1968, now Pat. No. 3,631,125, patented Dec. 28, 1971.

This invention relates to epoxide molding compositions. More particularly, this invention relates to epoxide molding compositions, containing m-tolylenediamine and a silicious filler, which have excellent shelf life and when molded into shaped articles and cured, result in products which are characterized by excellent properties.

Epoxide molding compositions, such as those based on epoxides having more than one glycidyl group per molecule, are generally formulated utilizing an epoxide curing agent and a filler which is used primarily to reduce the amount of the more expensive ingredients in the ultimate compositions. Of the many fillers proposed for use in epoxide molding compositions, silicious fillers have been found to provide a number of additional advantages including (1) reducing shrinkage during the curing and molding cycle of the epoxide compositions (2) improving the thermal conductivity of the epoxide compositions and thereby providing for a faster cure cycle (3) reducing the tendency of the ultimate molded articles to absorb water (4) improving the abrasion resistance and dimensional stability of the ultimate molded articles and (5) stabilizing the electrical characteristics of the ultimate molded articles during aging.

The advantages of utilizing a silicious filler has been offset, in many instances, by the poor shelf life of the epoxide molding compositions containing these fillers. As an illustration, an epoxide composition containing m-phenylenediamine, as a curing agent, and a silicious filler have been found to have poor shelf life, curing to infusible products, in many instances, before they can be used in the desired manner.

The present invention provides epoxide molding compositions, containing a silicious filler, which have excellent shelf life and in which the silicious fillers provide all of the advantages previously discussed.

The curable compositions of this invention comprise an epoxide having more than one glycidyl group per molecule, m-tolylenediamine in an amount sufficient to cure the compositions to infusible products and a silicious filler in an amount of about 0.5 to about 8 times preferably about 2 to about 4 times the amount of the epoxide.

The epoxides which can be utilized in accordance with this invention are those compounds having more than one glycidyl group per molecule. These compounds, wherein the oxygen of the epoxy group is attached to vicinal carbon atoms, can be saturated or unsaturated, aliphatic, cycloaliphatic, or heterocyclic and can be substituted with substituents such as halogen atoms, alkyl groups, ether groups and the like.

Illustrative of suitable epoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenol described in Bender et al., U.S. Pat. 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, the heptaphenylols described in U.S. Pat. 2,885,385 to A. G. Farnham. The phenols may contain substituents such as alkyl or aryl ring substituents or halogens, as exemplified by the alkyl resorcinols, tribromoresorcinols and the diphenols containing alkyl and halogen substituents on the aromatic ring (Bender et al., U.S. Pat. 2,506,486). The polyhydric polynuclear phenols can consist of two or more phenols connected by such groups as methylene, alkylene or sulfone. The connecting groups are further exemplified by bis(p-hydroxyphenyl)methane, 2,2-bis(p-hydroxyphenyl)propane and dihydroxydiphenyl sulfone.

Process for the preparation of polyglycidyl ethers of polyhydric phenols is described in detail in the Bender et al. patent (supra) and U.S. Pat. 2,943,095 to A. G. Farnham et al.

Particularly desirable for purposes of this invention are the polyglycidyl ethers of the bis(hydroxyphenyl)alkanes, for example the diglycidyl ether of 2,2-bis(p-hydroxyphenyl)propane and the diglycidyl ether of bis(p-hydroxyphenyl)methane. Other suitable polyglycidyl ethers of polyhydric phenols are enumerated in U.S. Pat. 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. Pat. 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl, m-phenylene diamine, p-phenylene diamine, 4,4-diaminodiphenyl methane, or with amino phenols, such as p-amino phenol, 5-amino-1-naphthol, 4-amino resorcinol, 2-methyl-4-amino phenol, 2-chloro-4-amino phenol and the like. Specific compounds include, among others, N,N-diglycidyl aniline, N,N-diglycidyl-2,6-dimethyl aniline, N,N,N,N-tetraglycidyl-4,4-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Pats. 2,951,825 and 2,951,822 to N. H. Reinking and N. H. Reinking et al., respectively.

The term m-tolylenediamine as used herein encompasses all isomers and mixtures thereof such as 3,5-diaminotoluene, 2,4-diaminotoluene and 2,6-diaminotoluene.

Illustrative of silicious fillers suitable for purposes of this invention are silica (amorphous, microcrystalline or macrocrystalline) silica flour, diatomaceous silica, flint powder, slate, powder, glass fibers, ground glass, fine glass beads, quartz powder, kaolin, calcined clay, talc and the like. It is to be understood that mixtures of silicious fillers and/or epoxides can be used if so desired.

In formulating the compositions this invention, the epoxide in a fluid state either as a liquid or fluidized by heat is added to the m-tolylenediamine and the silicious filler to form homogeneous compositions. It is then convenient to cast the resultant compositions into sheets on the order of about ¼ inch thick and to then allow the compositions, in the form of sheets to reach a brittle, fusible state. The sheets are then granulated to form a particulate molding composition.

The amount of m-tolylenediamine used is sufficient, as previously stated, to cure the epoxide to an infusible state. Generally this amount is about 90 percent of stoichiometric to about 10 percent in excess of stoichiometric. It is preferred to use about stoichiometric amounts. For purposes of stoichiometric calculations, one amino hydrogen atom is deemed to react with one epoxy group.

If desired other additives can be added to the compositions of this invention as for example, mold release agents such as zinc stearate, accelerators such as phenolic novolacs, materials which improve the electrical properties of the compositions such as hydrated alumina and the like.

Curing of the polyepoxide compositions can be effected at elevated temperatures, generally on the order of about 60° C. to about 200° C. The actual curing cycle will depend, in part, upon the exact formulation of the composition, size and shape of the article being formed as well as the temperature employed.

The compositions of this invention can be formed into many useful articles, as for example electrical casting which are used to encapsulate electrical components making the electrical components resistant to thermal and mechanical shock. The compositions can also be molded into such articles as coils, capacitors and the like.

It is to be understood that the disclosure of all patents and literature references noted are incorporated herein by reference.

The examples which follow further illustrate the present invention and are not intended to limit the scope thereof in any manner.

EXAMPLE 1

The formulations, which are noted below in parts by weight, were prepared by dissolving the powdered aromatic amine in the epoxide which had been preheated to a temperature of 65° C. Each resultant composition was spread out on an open tray to a thickness of about ½ inch. The trays were allowed to stand overnight at room temperature about 25° C. with the result that each composition advanced to a brittle, fusible state having similar hot plate gel times. Each composition was granulated and subjected to the tests listed below:

| | Control 1 | Composition A |
|---|---|---|
| Formulation: | | |
| Diglycidylether of 2,2-bis(p-hydroxyphenyl)propane epoxide equivalent weight=183 | 184 | 184 |
| Meta-phenylenediamine | 27 | |
| Meta-tolylenediamine | | 30.5 |
| (2,4-diaminotoluene—80% by eight) | | |
| (2,6-diaminotoluene—20% by weight) | | |
| Initial properties: | | |
| Hot plate gel time, secs | 54 | 55 |
| Plate flow, inches | 2½ | 2½ |
| After 4 hours age at 40° C.: | | |
| Hot plate gel time, secs | 15 | 15 |
| Plate flow, inch | ⅛ | ⅛ |
| After 46 hours age at 25°: | | |
| Hot plate gel time, secs | 33 | 33 |
| Plate flow, inch | ¾ | ¾ |
| After 70 hours age at 25° C.: | | |
| Hot plate gel time, secs | 26 | 23 |
| Plate flow, inch | ⅝ | ½ |

Gel Time—determined by placing a one gram sample of the composition on a hot plate which was at a temperature of 150° C. Each composition was stroked with a spatula and the time required to reach a "no string" condition noted and reported as the Gel Time. A "no string" condition is reached when there is no pulling of strings of material, by the spatula, from the main body of the composition.

Plate Flow—determined by placing a one gram sample of the composition on a vertical plate, six inches by 12 inches, and placing the plate with the sample thereon in an oven preheated to a temperature of 160° C. The amount of flow by the material after 20 minutes was noted and reported as Plate Flow.

The results of Example 1 clearly show that the initial properties of the compositions are almost identical.

EXAMPLE 2

Compositions, the formulations of which are below in parts by weight were prepared by melting the phenolic novolac and admixing it with the diglycidylether of 2,2-bis(p-hydroxyphenyl)propane. The mixture was heated to a temperature of 50° C. and powdered hardener added thereto. The same equivalent amount of hardener was used in each instance. Silica flour and zinc stearate were added and the resultant mixture subjected to a ten minute mixing cycle, including a two-minute deaeration cycle, in a Baker Perkins dispersion type mixer. Each composition was spread out on an open tray to a thickness of one-half inch. The trays were allowed to stand overnight at room temperature, about 23° C., with the result that each thermosetting composition advanced to a brittle grindable state. Each composition was then granulated before being tested.

The phenolic novolac was a phenol-formaldehyde novolac resin having a molecular weight of about 600 and having 6 phenolic hydroxyl groups per molecule.

| | Control 2 | Composition B |
|---|---|---|
| Formulation: | | |
| Diglycidylether of 2,2-bis(p-hydroxyphenyl) propane—epoxide equivalent weight=183 | 183 | 183 |
| Phenolic novolac | 9.5 | 9.5 |
| m-Phenylenediamine | 25.7 | |
| m-Tolylenediamine (same as in Ex. 1) | | 29.0 |
| Silica flour | 590.0 | 599.02 |
| Zinc stearate | 8.1 | 8.2 |

The compositions were then tested as to shelf life by the Spiral Flow Test described in detail in The Society of the Plastics Industry pamphlet EMMI-6. The greater the change in Spiral Flow, from the initial value, the poorer the shelf life of the composition tested. The results of the Spiral Flow tests are noted below:

| | Control 2 | Composition B |
|---|---|---|
| Spiral flow: | | |
| Initial | 31½ | 40½ |
| After 4 hrs. age at 100° F | 4¾ | 13¼ |
| After 6 hrs. age at 100° F | 1½ | 10 |
| Spiral flow: | | |
| Initial | 31½ | 40½ |
| After 1 day at 25° C | 26½ | 34¾ |
| After 5 days at 25° C | 17 | 28 |

On the basis of 25 inches spiral flow (300° F. at a pressure of 1000 p.s.i.) normally being required for encapsulation of electronic devices, the compound based on m-tolylenediamine is good for 5 days whereas the molding material based on m-phenylenediamine meets this requirement for only one day and therefore has significantly less shelf life.

Similar results were achieved using as the "m-tolylenediamine" the following:

(1) 2,4-diaminotoluene
(2) 2,6-diaminotoluene

What is claimed is:
1. A solid curable polyepoxide molding composition comprising an epoxide having more than one glycidyl group per molecule, m-tolylenediamine in an amount sufficient to cure said composition to the cured state and a silicious filler in an amount of about 0.5 to about 8 times the amount of said epoxide.

2. A composition as defined in claim 1 wherein the silicious filler is present in an amount of about 2 to about 4 times the amount of said epoxide.

3. A composition as defined in claim 1 wherein the m-tolylenediamine is a mixture of 2,4-diaminotoluene and 2,6-diaminotoluene.

4. A composition as defined in claim 1 wherein the m-tolylenediamine is 2,4-diaminotoluene.

5. A composition as defined in claim 1 wherein the m-tolylenediamine is 2,6-diaminotoluene.

6. A composition as defined in claim 1 wherein the polyepoxide is the polyglycidylether of a polyhydric phenol.

7. A composition as defined in claim 1 wherein the polyepoxide is the polyglycidylether of a dihdric phenol.

8. A composition as defined in claim 1 wherein the polyepoxide is the polyglycidylether of 2,2-bis(p-hydroxyphenyl) propane.

9. A composition as defined in claim 1 wherein the silicious filler is silica flour.

10. A composition as defined in claim 1 wherein the m-tolylenediamine is present in an amount of about 90 percent of stoichiometric to about 10 percent in excess of stoichiometric.

References Cited

UNITED STATES PATENTS

| | | | |
|---|---|---|---|
| 3,138,641 | 6/1964 | Powers | 260—578 |
| 3,132,115 | 5/1964 | Pschorr et al. | 260—37 Ep X |
| 3,346,533 | 10/1967 | Strother | 260—37 Ep X |
| 3,546,169 | 12/1970 | Cole | 260—47 EN |

FOREIGN PATENTS

| | | | |
|---|---|---|---|
| 803,547 | 10/1958 | Great Britain | 260—47 EN |

LEWIS T. JACOBS, Primary Examiner

U.S. Cl. X.R.

260—47 EN